United States Patent
Duga et al.

(10) Patent No.: US 6,195,667 B1
(45) Date of Patent: Feb. 27, 2001

(54) ON-LINE MENU UPDATING FOR AN ELECTRONIC BOOK

(75) Inventors: Brady Duga, Carlsbad; Aleksey Novicov, Palo Alto; William S. Leshner, Carlsbad; Garth Conboy, La Jolla; James Sachs, Menlo Park, all of CA (US)

(73) Assignee: SoftBook Press, Inc., Menlo Park, CA (US)

( * ) Notice: Subject to any disclaimer, the term of this patent is extended or adjusted under 35 U.S.C. 154(b) by 0 days.

(21) Appl. No.: 09/174,067

(22) Filed: Oct. 16, 1998

(51) Int. Cl.[7] .................................................. G06F 17/30

(52) U.S. Cl. ........................................ 707/513; 707/501

(58) Field of Search .................................... 707/501, 513, 707/526; 345/326, 333, 352, 353, 357

(56) References Cited

U.S. PATENT DOCUMENTS

| D. 276,626 | 12/1984 | Lockwood . |
| D. 289,777 | 5/1987 | Thomas . |
| D. 330,544 | 10/1992 | Kane . |
| D. 339,329 | 9/1993 | Lacko . |
| D. 346,620 | 5/1994 | McSorely . |

(List continued on next page.)

FOREIGN PATENT DOCUMENTS

| 0 390 611 | 3/1990 | (EP) . |
| 2 657 451 | 1/1990 | (FR) . |
| 2 657 187 | 7/1991 | (FR) . |
| 2 149 544 | 6/1995 | (GB) . |
| WO 87/01481 | 3/1987 | (WO) . |
| WO 89/05023 | 6/1989 | (WO) . |
| WO 97/20274 | 6/1997 | (WO) . |

OTHER PUBLICATIONS

Mihai Munteanu, MenuApplet, version 1.0, The Java Boutique, <http://javaboutique.internet.com/MenuApplet/>, 1998, pp. 1–7 and a screen printout.*

Michael Shipp, popupURL, The Java Boutique, <http://javaboutique.internet.com/popupURL/>, Oct. 8, 1998, pp. 1–3 and a screen printout.*

Teach yourself web publishing with HTML 4 in 14 days, second edition, sams.net publishing, 1997, pp. 75–77.*

WAP WML. Wireless Application Protocol; Wireless Markup Language Sepecification, Apr. 30, 1998, pp. 34 & 32, Wireless Application Protocol Forum, Ltd.

Dvorak, et al. Methodology for User Centred Link Structures for Textbook to Hypertext Conversion, IEEE, Jan. 1992, pp. 619–628.

Pobiak Adjustable Access Electronic Books, IEEE, Jan. 1992, pp. 90–94.

(List continued on next page.)

Primary Examiner—Stephen S. Hong
(74) Attorney, Agent, or Firm—Townsend and Townsend and Crew LLP

(57) ABSTRACT

A method for on-line displaying and updating a dynamic menu included in a page requested by a viewing device from a server. The dynamic menu has at least one item. The viewing device has a display screen and a menu function key for displaying a default menu when the viewing device is off-line. The method includes the following steps: (a) sending the page to the viewing device as a hypertext language code, the hypertext language code including a menu tag which specifies the dynamic menu; (b) receiving the page at the viewing device; (c) parsing the hypertext language code to identify the menu tag; (d) displaying the page on the display screen; (e) displaying the dynamic menu on the display screen when the menu function key is activated; and (f) performing a dynamic action when one item of the dynamic menu is selected by an action of a user of the viewing device.

12 Claims, 6 Drawing Sheets

U.S. PATENT DOCUMENTS

| | | |
|---|---|---|
| D. 359,306 | 6/1995 | Lande et al. . |
| D. 362,271 | 9/1995 | Luong . |
| D. 362,272 | 9/1995 | Luong . |
| D. 362,461 | 9/1995 | Luong . |
| 3,718,906 | 2/1973 | Lightner . |
| 4,159,417 | 6/1979 | Rubincam . |
| 4,490,810 | 12/1984 | Hon . |
| 4,545,023 | 10/1985 | Mizzi . |
| 4,575,621 | 3/1986 | Dreifus . |
| 4,591,974 | 5/1986 | Dornbush et al. . |
| 4,597,058 | 6/1986 | Izumi et al. . |
| 4,601,011 | 7/1986 | Grynberg . |
| 4,649,499 | 3/1987 | Sutton et al. . |
| 4,682,161 | 7/1987 | Bugg . |
| 4,725,977 | 2/1988 | Izumi et al. . |
| 4,779,080 | 10/1988 | Coughlin et al. . |
| 4,820,167 | 4/1989 | Nobles et al. . |
| 4,855,725 | 8/1989 | Fernandez . |
| 4,899,292 | 2/1990 | Montagna et al. . |
| 4,916,441 | 4/1990 | Gombrich . |
| 4,918,632 | 4/1990 | York . |
| 4,972,496 | 11/1990 | Sklarew . |
| 4,985,697 | 1/1991 | Boulton . |
| 5,021,989 | 6/1991 | Fujisawa et al. . |
| 5,025,373 | 6/1991 | Keyser, Jr. et al. . |
| 5,031,119 | 7/1991 | Dulaney et al. . |
| 5,065,345 | 11/1991 | Knowles et al. . |
| 5,091,939 | 2/1992 | Cole et al. . |
| 5,109,354 | 4/1992 | Yamashita et al. . |
| 5,115,508 | 5/1992 | Hatta . |
| 5,121,492 | 6/1992 | Saville, III et al. . |
| 5,133,076 | 7/1992 | Hawkins et al. . |
| 5,146,552 | 9/1992 | Cassorla et al. . |
| 5,157,491 | 10/1992 | Kassatly . |
| 5,157,737 | 10/1992 | Sklarew . |
| 5,157,783 | 10/1992 | Anderson et al. . |
| 5,199,104 | 3/1993 | Hirayama . |
| 5,203,001 | 4/1993 | Yanaqiuchi et al. . |
| 5,214,696 | 5/1993 | Keiser, II et al. . |
| 5,221,838 | 6/1993 | Gutman et al. . |
| 5,222,136 | 6/1993 | Rasmussen et al. . |
| 5,226,080 | 7/1993 | Cole et al. . |
| 5,231,662 | 7/1993 | van Rumpt et al. . |
| 5,233,333 | 8/1993 | Borsuk . |
| 5,239,665 | 8/1993 | Tsuchiya . |
| 5,245,656 | 9/1993 | Loeb et al. . |
| 5,247,661 | 9/1993 | Hager et al. . |
| 5,253,294 | 10/1993 | Maurer . |
| 5,319,582 | 6/1994 | Ma . |
| 5,333,116 | 7/1994 | Hawkins et al. . |
| 5,339,091 | 8/1994 | Yamazaki et al. . |
| 5,359,707 | 10/1994 | Sato . |
| 5,365,598 | 11/1994 | Sklarew . |
| 5,367,621 | 11/1994 | Cohen et al. . |
| 5,379,057 | 1/1995 | Clough et al. . |
| 5,388,196 | 2/1995 | Pajak et al. . |
| 5,392,387 | 2/1995 | Fitzpatrick et al. . |
| 5,398,310 | 3/1995 | Tchao et al. . |
| 5,404,505 | 4/1995 | Levinson . |
| 5,428,606 | 6/1995 | Moskowitz . |
| 5,438,344 | 8/1995 | Oliva . |
| 5,457,746 | 10/1995 | Dolphin . |
| 5,463,725 | 10/1995 | Henckel et al. . |
| 5,465,213 | 11/1995 | Ross . |
| 5,467,102 | 11/1995 | Kuno et al. . |
| 5,475,399 | 12/1995 | Borsuk . |
| 5,477,510 | 12/1995 | Ukita . |
| 5,483,586 | 1/1996 | Sussman . |
| 5,598,470 | 1/1997 | Cooper et al. . |
| 5,615,264 | 3/1997 | Kazmierczak et al. . |
| 5,629,980 | 5/1997 | Stefik et al. . |
| 5,638,443 | 6/1997 | Stefik et al. . |
| 5,697,793 | 12/1997 | Huffman et al. . |
| 5,706,458 | 1/1998 | Koppolu . |
| 5,719,943 | 2/1998 | Amada et al. . |
| 5,734,823 | 3/1998 | Saigh et al. . |
| 5,734,891 | 3/1998 | Saigh . |
| 5,802,526 | 9/1998 | Fawcett et al. . |
| 5,890,172 * | 3/1999 | Borman .............................. 707/501 |

OTHER PUBLICATIONS

Ramos Making Book on Electronic Books, College Store Journal—Sep./Oct. 1992.

Cox Technology Threatens to Shatter the World of College Textbooks The Wall Street Journal—Electronic Campus, Jun. 1, 1993.

Watanabe et al., Visual Interface for Retrieval of Electronic–Formed Books, IEEE, Jul. 1993, pp. 692–695.

The Heller Report, Oct. 1993.

Ziegler IBM to Unveil Plan to Skip Disks, Send Software by Satellite, The Wall Street Journal, Nov. 1, 1994.

Fisher This Little Compute rTries to be Book, St. Louis Post–Dispatch, Jan. 4, 1995.

* cited by examiner

ON-LINE MENU UPDATING FOR AN ELECTRONIC BOOK

BACKGROUND OF THE INVENTION

1. Field of the Invention

The present invention relates generally to a distribution system of digital contents, i.e., digitally encoded published materials. More particularly, the invention relates to a method for on-line controlling and updating a dynamic menu sent from a virtual bookstore to an electronic book.

2. Description of Related Art

Advances in computer and communication technology have provided to the consumers a convenient and economical means to access information in a variety of media. One particular area of information access is the electronic books. An electronic book is a viewing device that receives printed materials in the form of digital data downloaded from an information network. A user of an electronic book can read downloaded contents of books and printed materials subscribed from a participating bookstore at his or her own convenience without the need to purchase the printed copies of the books.

The World Wide Web (WWW) has now become a popular means for publishing printed materials in the open network domain. The WWW refers to the abstract cyberspace of information which is transmitted over the physical networks, such as the Internet. The WWW publishing works under a client-server model. A Web server is a program running on a server to serve documents to other computers or devices that send requests for the documents. A Web client is a program that lets the user request documents from a server. To facilitate the downloading of printed materials, the contents of these documents are typically created in a form compatible with network transmission format. The documents sent by the server are in a hypertext language format. A popular hypertext language is the HyperText Markup Language (HTML) which is a fairly limited formatting language.

To better serve the user, the server may want to display a dynamic menu on the viewing device when the viewing device is on-line. It is desirable that the user of the viewing device be able to select an item from this dynamic menu and that such selection would activate a dynamic action.

Therefore, there is a need for a method to display and update a dynamic menu on the display screen of a viewing device when it is on-line with a server.

SUMMARY OF THE INVENTION

The present invention is a method for on-line displaying and updating a dynamic menu included in a page requested by a viewing device from a server. The dynamic menu has at least one item. The viewing device has a display screen and a menu function key for displaying a default menu when the viewing device is off-line. The method includes the following steps: (a) sending the page to the viewing device as a hypertext language code, the hypertext language code including a menu tag which specifies the dynamic menu; (b) receiving the page at the viewing device; (c) parsing the hypertext language code to identify the menu tag; (d) displaying the page on the display screen; (e) displaying the dynamic menu on the display screen when the menu function key is activated; and (f) performing a dynamic action when one item of the dynamic menu is selected by an action of a user of the viewing device.

The method further includes the steps of releasing the dynamic menu from the display screen if the page is dismissed by the user of the viewing device; and releasing the dynamic menu from the display screen if the dynamic action dismisses the dynamic menu.

DETAILED DESCRIPTION OF THE INVENTION

The present invention is a method for on-line displaying and updating a dynamic menu included in a page requested by a viewing device from a server. The method includes identifying the menu tags included in the hypertext language page, displaying the dynamic menu specified by the menu tags when the menu function key is activated, and performing dynamic action when an item of the dynamic menu is selected.

Figure 1:
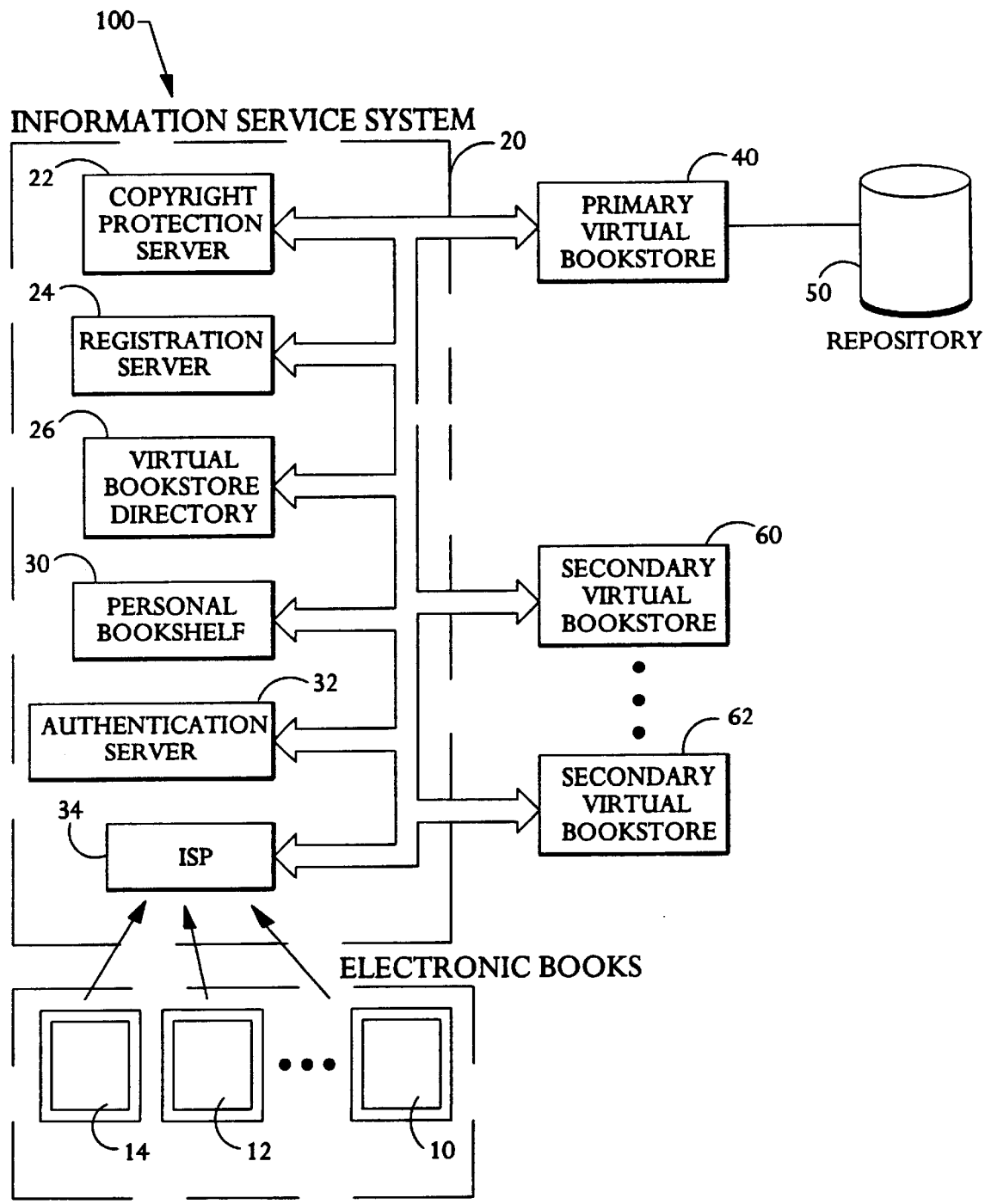
FIG. 1 is a diagram illustrating a system in which one embodiment of the invention can be practiced.

FIG. 1 is a diagram illustrating a system 100 in which one embodiment of the invention can be practiced.

Referring to FIG. 1, the system 100 comprises: (a) at least one portable electronic book 10 operative to request a digital content from a catalog of distinct digital contents, to receive and display the requested digital content in readable form; (b) an information services system 20 which includes an authentication server 32 for authenticating the identity of the requesting portable electronic book 10 and a copyright protection server 22 for rendering the requested digital content sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct digital contents; and (d) a repository 50, in electrical communication with the primary virtual bookstore 40, for storing the distinct digital contents listed in the catalog.

The system 100 preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

The system 100 can further comprise a secondary virtual bookstore 60 in electrical communication with the information services system 20. In this case, the information services system 20 also includes a directory of virtual bookstores 26 in order to provide the portable electronic book 10 with access to the secondary virtual bookstore 60 and its catalog of digital contents.

The information services system 20 can optionally include a notice board server for sending messages from one of the virtual bookstores, primary or secondary, to a portable electronic book in the system.

The information services system 20 also includes a registration server 24 for keeping track of the portable electronic books that are considered active accounts in the system and for ensuring that each portable electronic book is associated with a primary virtual bookstore in the system. In the case where the optional notice board server is included in the information services system 20, the registration server 24 also allows each portable electronic book user to define his/her own notice board and document delivery address.

The information services system 20 preferably comprises a centralized bookshelf 30 associated with each portable electronic book 10 in the system. Each centralized bookshelf 30 contains all digital contents requested and owned by the associated portable electronic book 10. Each portable electronic book 10 user can permanently delete any of the owned digital contents from the associated centralized bookshelf 30. Since the centralized bookshelf 30 contains all the digital contents owned by the associated portable electronic book 10, these digital contents may have originated from different virtual bookstores. The centralized bookshelf 30 is a storage extension for the portable electronic book 10. Such storage extension is needed since the portable electronic book 10 has limited. non-volatile memory capacity.

The user of the portable electronic book 10 can add marks, such as bookmarks, inking, highlighting and underlining, and annotations on a digital content displayed on the screen of the portable electronic book, then stores this marked digital content in the non-volatile memory of the electronic book 10. The user can also upload this marked digital content to the information services system 20 to store it in the centralized bookshelf 30 associated with the portable electronic book 10, for later retrieval. It is noted that there is no need to upload any unmarked digital content, since it was already stored in the centralized bookshelf 30 at the time it was first requested by the portable electronic book 10.

The information services system 20 further includes an Internet Services Provider (ISP) 34 for providing Internet network access to each portable electronic book in the system.

The electronic book 10 has persistent memory, such as a flash random-access-memory (RAM), to store the downloaded digital contents, a display screen to display the digital contents and a processor to control the display. An electronic book 10 has a function key or function icon to activate a default menu which is stored in its memory. The default menu is static, i.e., it does not change. The default menu is displayed any time the menu function key is activated, regardless of whether the viewing device is on-line or off-line.

When practiced in the system 100 of FIG. 1, the present invention allows the virtual bookstore to display a dynamic menu on the display screen of the electronic book 10 when the electronic book 10 is on-line. The invention allows the user of the electronic book to select an item from this dynamic menu and allows a dynamic action to be performed upon such selection.

Figure 2:
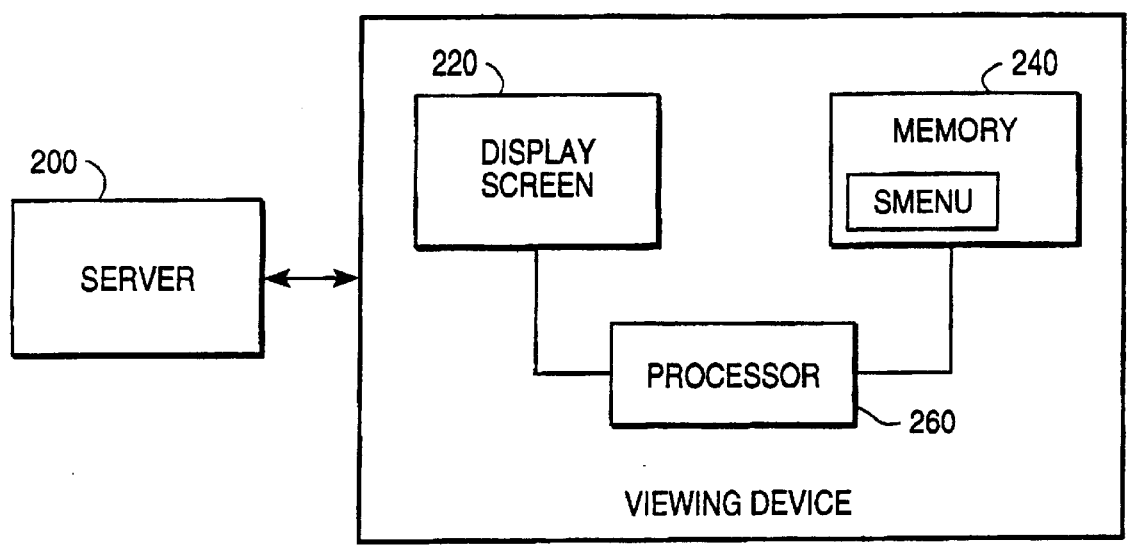
FIG. 2 is a block diagram of the system of the present invention.

FIG. 2 is a block diagram of the system of the present invention. The system includes a server 200 and a viewing device 210. The viewing device includes a display screen 220, a memory 240, and a processor 260.

Figure 3A:
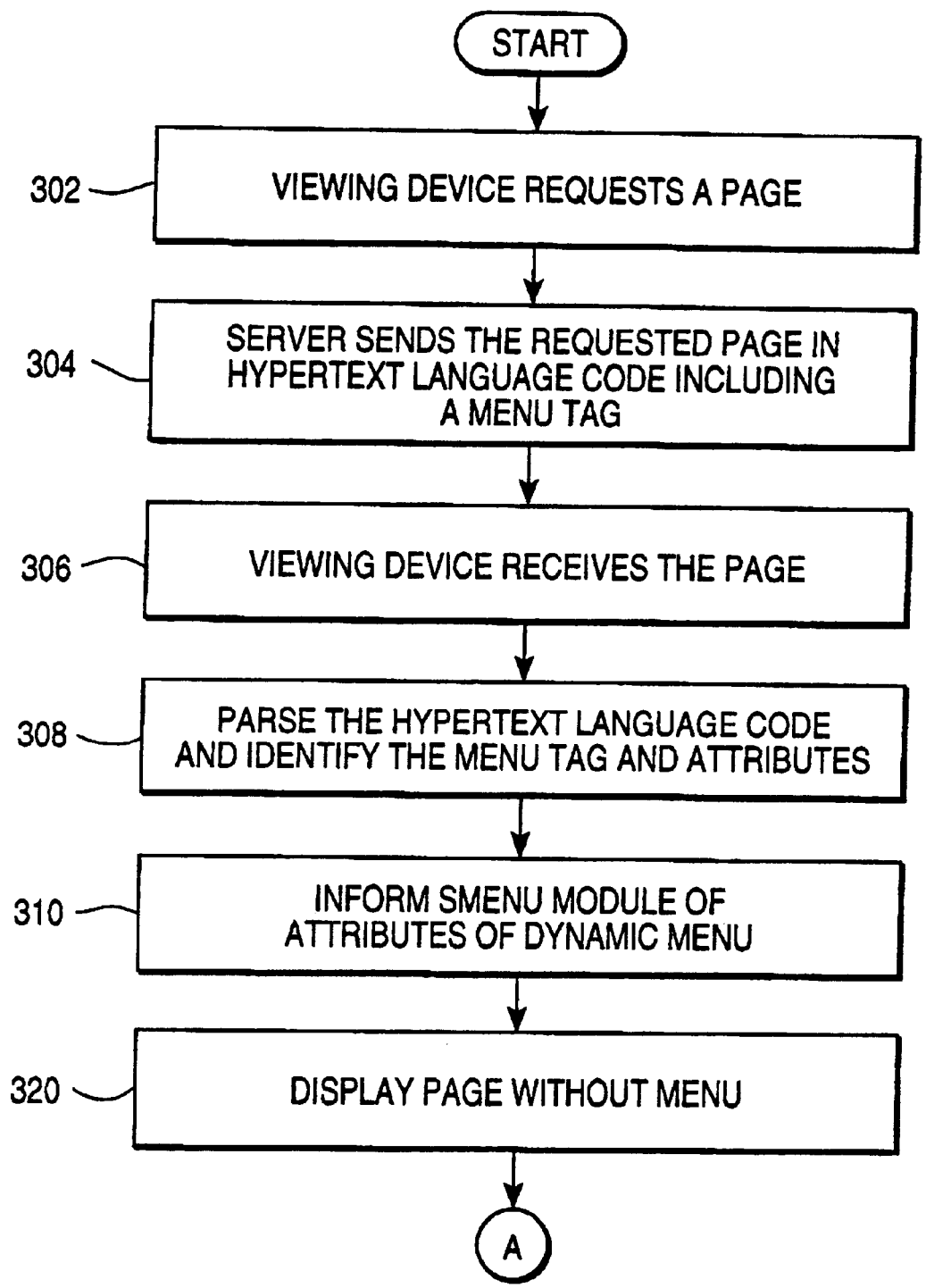
FIGS. 3A and 3B are a flowchart illustrating one embodiment of the method of the present invention.
Figure 3B:
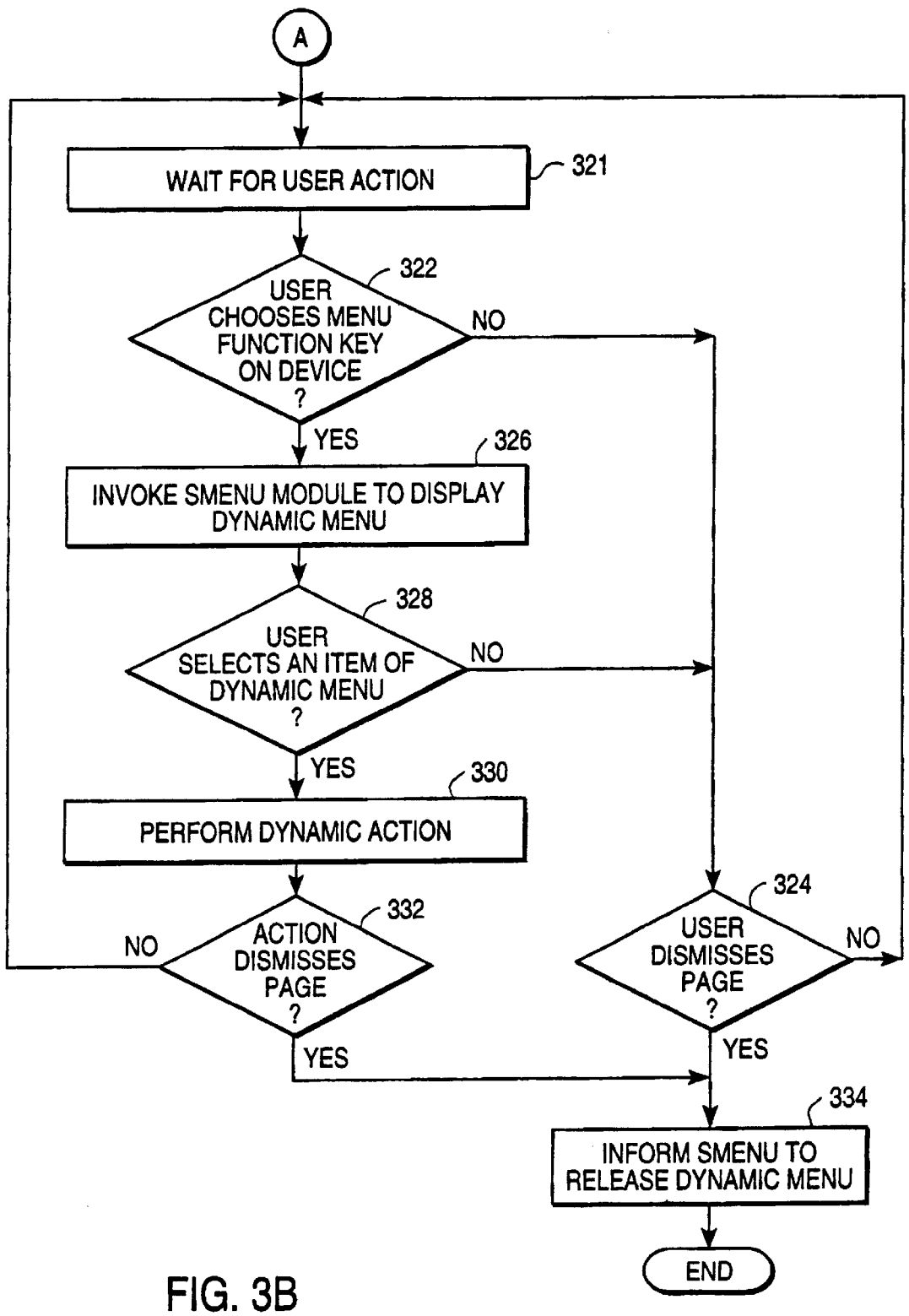

FIGS. 3A and 3B are a flowchart illustrating one embodiment of the method of the present invention.

Referring to FIG. 2 and FIG. 3, the viewing device 210 requests a page from the server 200 (Block 302). The server 200 then sends the requested page in a hypertext language format (Block 304). A menu tag and menu tag attributes, which specify a dynamic menu, are included in the hypertext language code. The viewing device 210 receives the requested page (Block 306).

The processor 260 parses the hypertext language code and identifies the menu tag and its attributes (Block 308). The processor 260 informs the SMENUmodule of the identified menu tag attributes (Block 310). The SMENU module which resides in memory 240 is in charge of controlling display of the dynamic menu. The processor then displays the page without the dynamic menu (Block 320) and waits for the user action (Block 321).

The processor determines whether the user activates the menu function key of the viewing device (Block 322). If the menu function key is not activated, then the processor determines whether the user dismisses the displayed page (Block 324). If so, the processor informs the SMENU module to release the dynamic menu (Block 334).

If the menu function key is activated, then the processor triggers the SMENU module to display the dynamic menu. If the user selects an item on the dynamic menu (Block 328), the SMENU module performs a dynamic action as determined by the menu tag attributes corresponding to the selected item (Block 330).

If the dynamic action dismisses the displayed page, then the processor informs the SMENU module to release the dynamic menu (Block 334).

If the dynamic action does not dismiss the displayed page, then the processor waits for further user action (Block 321).

If the user does not select an item from the dynamic menu, then the processor determines whether the user dismisses the displayed page (Block 324). If so, the processor informs the SMENU module to release the dynamic menu (Block 334).

Figure 4A:
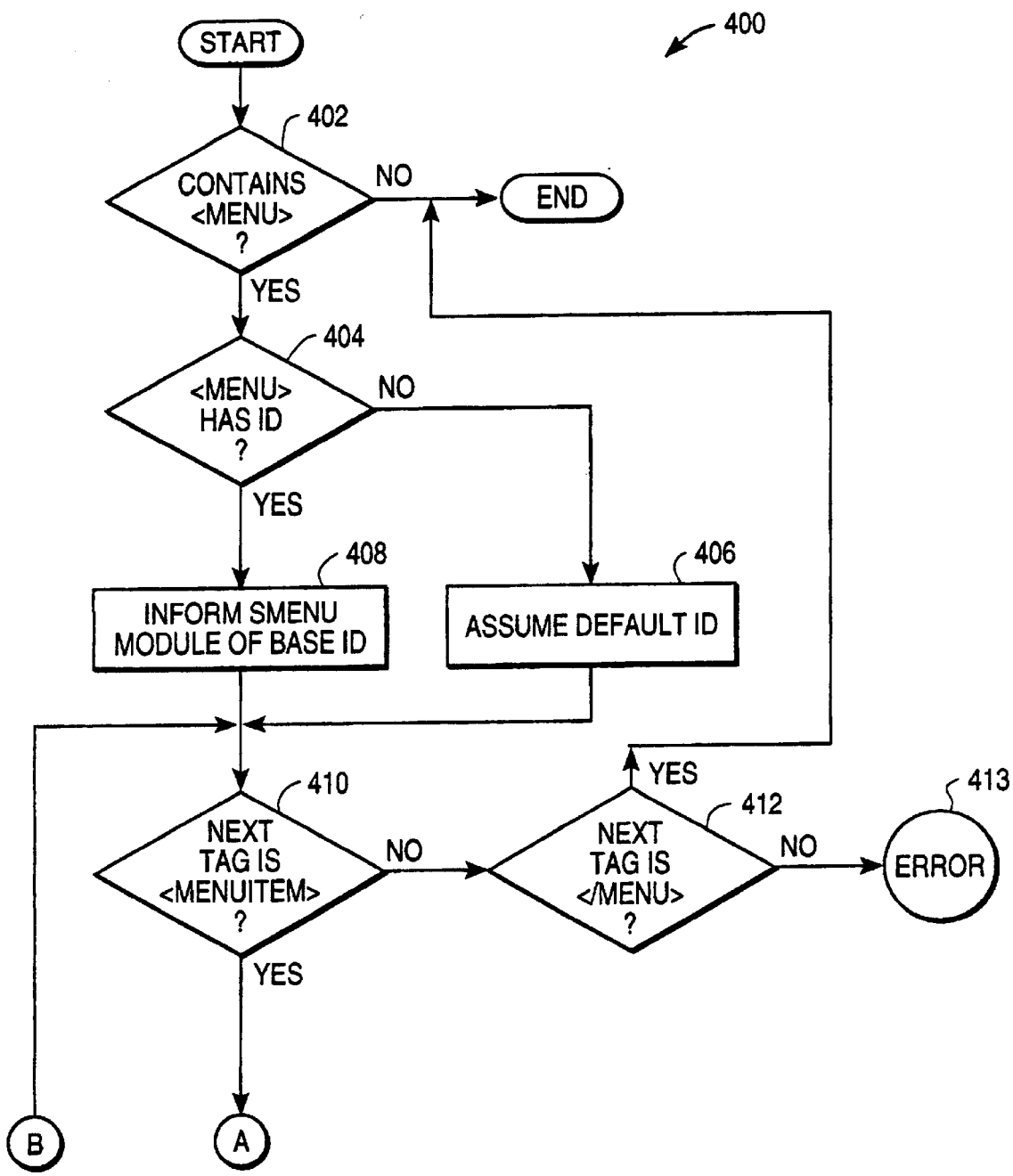
FIGS. 4A and 4B are a flowchart illustrating a process to identify menu tag and its attributes in a hypertext language code.
Figure 4B:
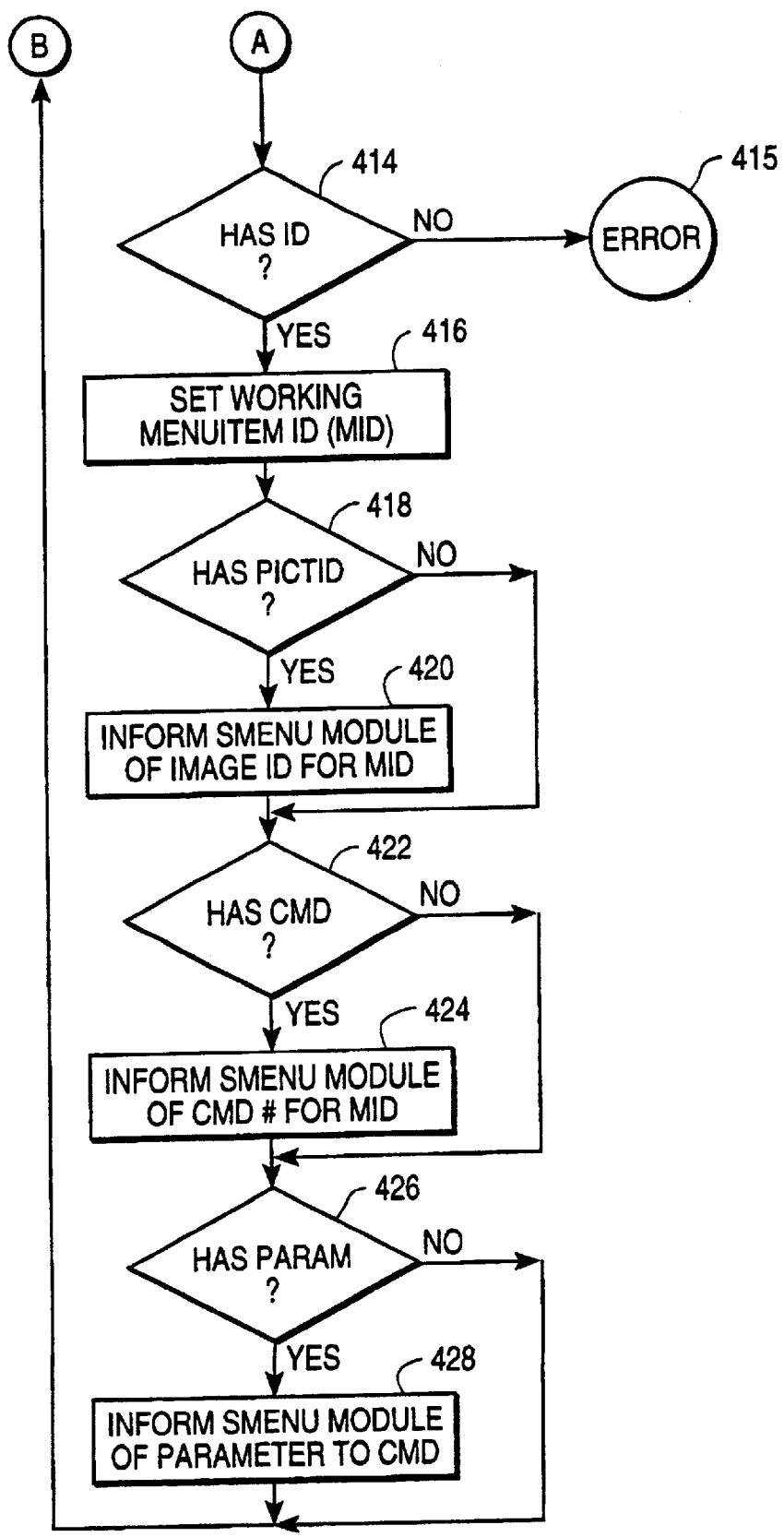

FIGS. 4A and 4B are a flowchart illustrating a process to identify a menu tag and its attributes in a hypertext language code.

The <MENU> tag allows the server to dynamically set the appearance and behavior of the soft menu on the viewing device. It can specify a known starting template menu to be used for that page and it may contain <MENUITEM> tags. The </MENU> tag indicates the end of the menu tag specification.

The <MENUITEM> tags are contained in the <MENU> . . . </MENU> tag pairs. This allows the editing of the specific items in the dynamic menu (i.e., setting icons, commands, and parameters). Special attributes of this tag are: CMD, PARAM, PICTID. The CMD attribute sets a numeric command to execute. The PARAM attribute indicates any special parameters for the operation. The PICTID indicates which read-only memory (ROM)-based image to be used as icon for the specified menu item.

Upon START, the process 400 determines if the hypertext language code contains a <MENU> tag (Block 402). If not, the process 400 terminates. If there is a <MENU> tag, then the process 400 determines if there is an ID attribute for the <MENU>tag (Block 404). If there is no ID attribute, then the process 400 assumes the ID to be the default menu ID (Block 406).

If there is an ID for the <MENU> tag, then the process 400 informs the SMENU module of this menu ID (Block 408).

The process 400 then determines if the next tag is a <MENUITEM> tag (Block 410). If it is not, then the process 400 determines if it is </MENU> which indicates the end of the menu tag specification (Block 412). If it is not </MENU>, then the process 400 terminates in error (Block 413). If it is </MENU> then the process 400 terminates normally (Block 403).

If the tag next to the <MENU> tag is a <MENUITEM> tag, then the process 400 determines if there is an ID attribute for the <MENUITEM> tag (Block 414). If there is no ID attribute, then the process 400 terminates in error (Block 415).

If there is an ID attribute for the <MENUITEM> tag, then the process 400 sets the working menu-item ID (MID) to the value of this ID attribute (Block 416).

The process 400 determines if there is a PICTID attribute for the <MENUITEM> tag (Block 418). If there is, then the process 400 informs the SMENU module of the identification of the image to be used for the identified menu-item (Block 420).

The process 400 proceeds to determine if there is a CMD attribute for the <MENUITEM> tag (Block 422). If there is, then the process 400 informs the SMENU module of the command number to be used for the identified menu-item (Block 424).

The process 400 proceeds to determine if there is a PARAM attribute for the <MENUITEM> tag (Block 422). If there is, then the process 400 informs the SMENU module of the parameter to be used with the command for the identified menu-item (Block 428).

The process 400 then determines if the next tag is a <MENUITEM> tag (Block 410) and continues as described above.

The following are examples of menu tags which specify dynamic menus in a hypertext language.

<MENU ID=123></MENU> means: switch to local menu having ID 123.

<MENU><MENUITEM ID=1 CMD=2></MENU> means: modify the first item of the default menu, setting its command to 2.

<MENU ID=123><MENUITEM ID=2 CMD=2 PICTID=500 PARAM="HREF://www.somemachine.com/orderform.html"></MENU> means: switch the menu to the local menu specified by ID 123, then change the second item in this local menu to have a command of 2, with an HREF for its parameter. The item will be drawn with the local image specified by ID 500.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A method for on-line displaying and updating a dynamic menu included in a page, the dynamic menu having at least one item, the page being requested by a viewing device from a server, the viewing device having a display screen and a menu function key for displaying a default menu when the viewing device is off-line, the method comprising:

(a) sending the page to the viewing device as a hypertext language code, the hypertext language code including a menu tag, the menu tag specifying the dynamic menu;

(b) receiving the page at the viewing device;

(c) parsing the hypertext language code to identify the menu tag;

(d) displaying the page on the display screen;

(e) displaying the dynamic menu on the display screen when the menu function key is activated; and (f) performing a dynamic action when one item of the dynamic menu is selected by an action of a user of the viewing device.

2. The method of claim 1 further comprising:

(g) releasing the dynamic menu from the display screen if the page is dismissed by the user of the viewing device; and (h) releasing the dynamic menu from the display screen if the dynamic action dismisses the dynamic menu.

3. The method of claim 1 wherein the menu tag has menu tag attributes.

4. The method of claim 3 wherein the menu tag attributes include an identification attribute, the identification attribute having a value, the value identifying a local menu template which resides in a memory of the viewing device.

5. The method of claim 1 wherein the menu tag has a default identification attribute, the default identification attribute identifying the default menu which resides in a memory of the viewing device.

6. The method of claim 1 wherein the menu tag includes a menu-item tag, the menu-item tag having menu-item tag attributes specifying modifications to one item of the menu.

7. The method of claim 6 wherein the menu-item tag attributes include an item identification attribute, the item identification attribute having a value identifying one item of the menu.

8. The method of claim 7 wherein the menu-item tag attributes include a command attribute, the command attribute having a value specifying a command for the item identified by the item identification attribute value.

9. The method of claim 7 wherein the menu-item tag attributes include a picture identification attribute, the picture identification attribute having a value identifying an image residing in memory of the viewing device, the image being selected for drawing the item identified by the item identification attribute value.

10. The method of claim 7 wherein the menu-item tag attributes include a parameter attribute, the parameter attribute having a value specifying a parameter of the item identified by the item identification attribute value.

11. The method of claim 1 wherein the viewing device is a portable electronic book.

12. The method of claim 1 wherein the server is a virtual bookstore.

* * * * *